Dec. 9, 1947.   C. H. O. TIMMERMAN   2,432,459
CARCASS SCRAPING MACHINE
Filed June 29, 1945   4 Sheets-Sheet 1

Inventor
Carl H. O. Timmerman,
By J. Stanley Burch
Attorney

Dec. 9, 1947.  C. H. O. TIMMERMAN  2,432,459
CARCASS SCRAPING MACHINE
Filed June 29, 1945  4 Sheets-Sheet 2

Inventor
Carl H.O. Timmerman,

By J. Stanley Burch
Attorney

Dec. 9, 1947.  C. H. O. TIMMERMAN  2,432,459
CARCASS SCRAPING MACHINE
Filed June 29, 1945  4 Sheets-Sheet 3

Inventor
Carl H. O. Timmerman,

By J. Stanley Burch
Attorney

Dec. 9, 1947.   C. H. O. TIMMERMAN   2,432,459
CARCASS SCRAPING MACHINE
Filed June 29, 1945   4 Sheets-Sheet 4

Inventor
Carl H. O. Timmerman,

By   J. Stanley Burch
Attorney

Patented Dec. 9, 1947

2,432,459

UNITED STATES PATENT OFFICE 2,432,459

CARCASS SCRAPING MACHINE

Carl H. O. Timmerman, Tulsa, Okla.

Application June 29, 1945, Serial No. 602,352

10 Claims. (Cl. 17—18)

1

This invention relates to an improved machine for scraping hog carcasses to remove bristles and the like therefrom.

The primary object of the present invention is to provide a machine of the above kind that is highly efficient in operation, simple in construction and economical to manufacture, easy and wise adapted for long-continued operation without getting out of order or requiring repair.

A further object of the invention is to provide a machine of the above kind including novel and efficient scraping elements, and novel and efficient means for supporting and moving said scraping elements across the carcass to afford a most efficient scraping action.

Another object of the invention is to provide a novel means to support and maintain the carcass in operative relation to the scraping means, and to deliver the scraped carcass from the machine.

A still further object is to provide a machine of the above kind including scraping disks mounted to revolve so as to present their entire edges to the carcass for scraping the latter and to insure an efficient and uniform scraping action.

Further and more specific objects and features of the present invention will become apparent from the following description, when considered in connection with the accompanying drawings, in which:

Figure 8 is a view similar to Figure 3, of a further modified form of scraping machine embodying the present invention.

Figure 1:
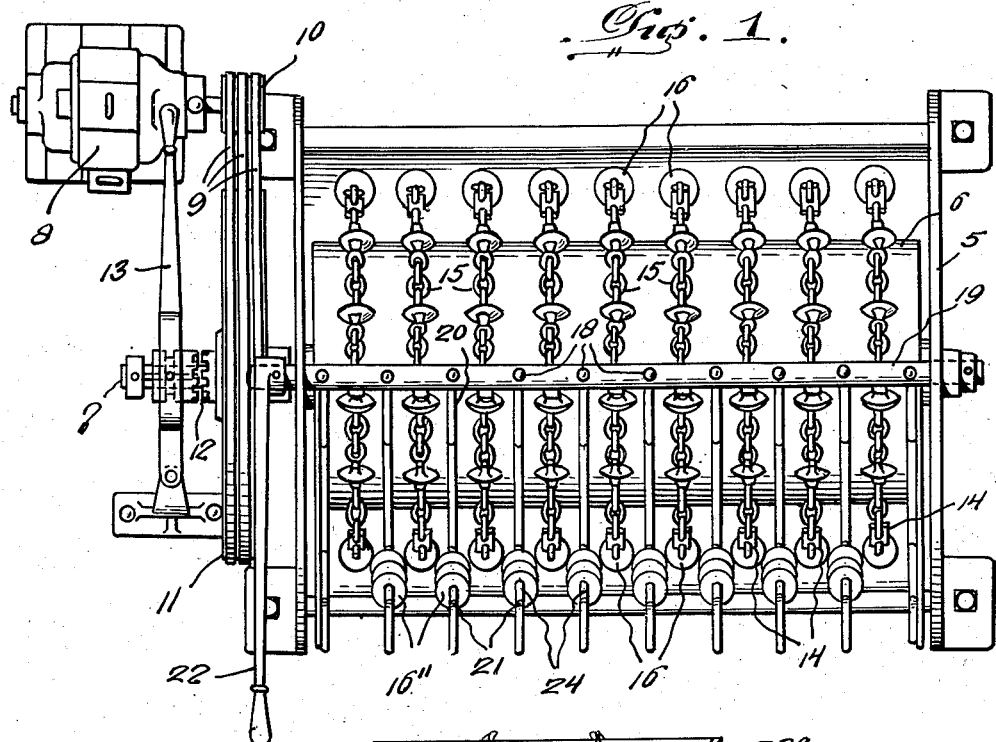
Figure 1 is a top plan view of a carcass scraping machine embodying the present invention.
Figure 2:
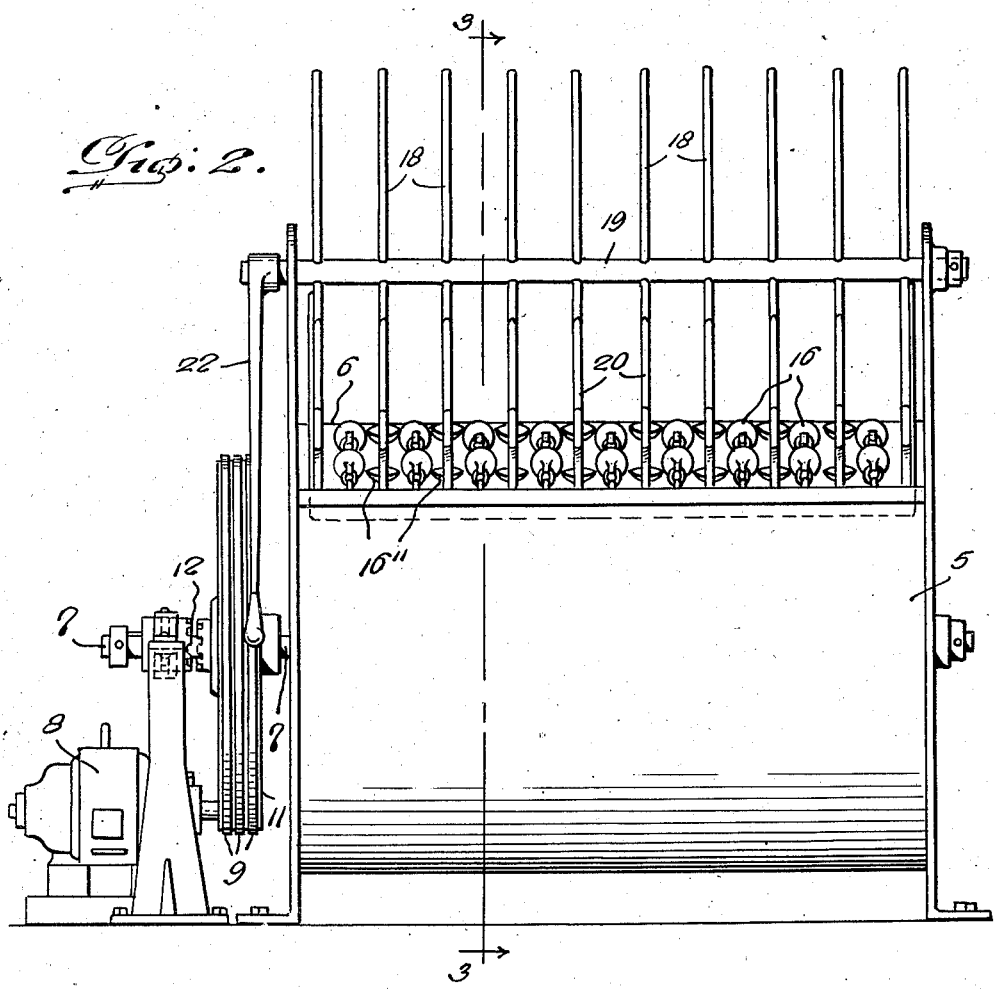
Figure 2 is a front elevation thereof.

Referring in detail to Figures 1 to 4 inclusive, the machine includes a tub 5 in which is journaled a scraping drum including a cylinder 6 secured on a shaft 7 that is journaled in the ends

2 of the tub. Shaft 7 is driven by a motor 8, preferably through a belt gearing including belts 9 passing around multiple pulleys 10 and 11 respectively secured on the shaft of motor 8 and shaft 7, pulley 11 being releasably clutched to shaft 7 by a clutch 12 operable by a hand lever 13.

Figure 5:
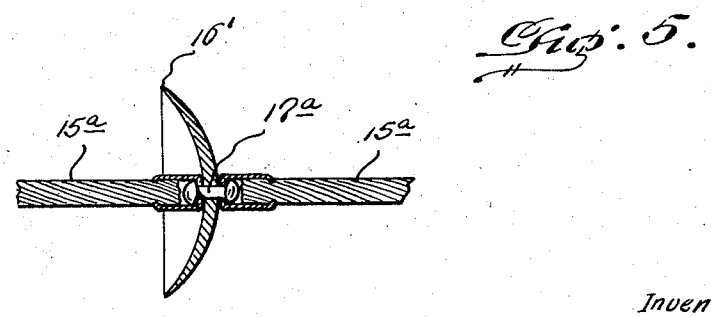
Figure 5 is a view somewhat similar to Figure 4, showing a modification.
Figure 3:
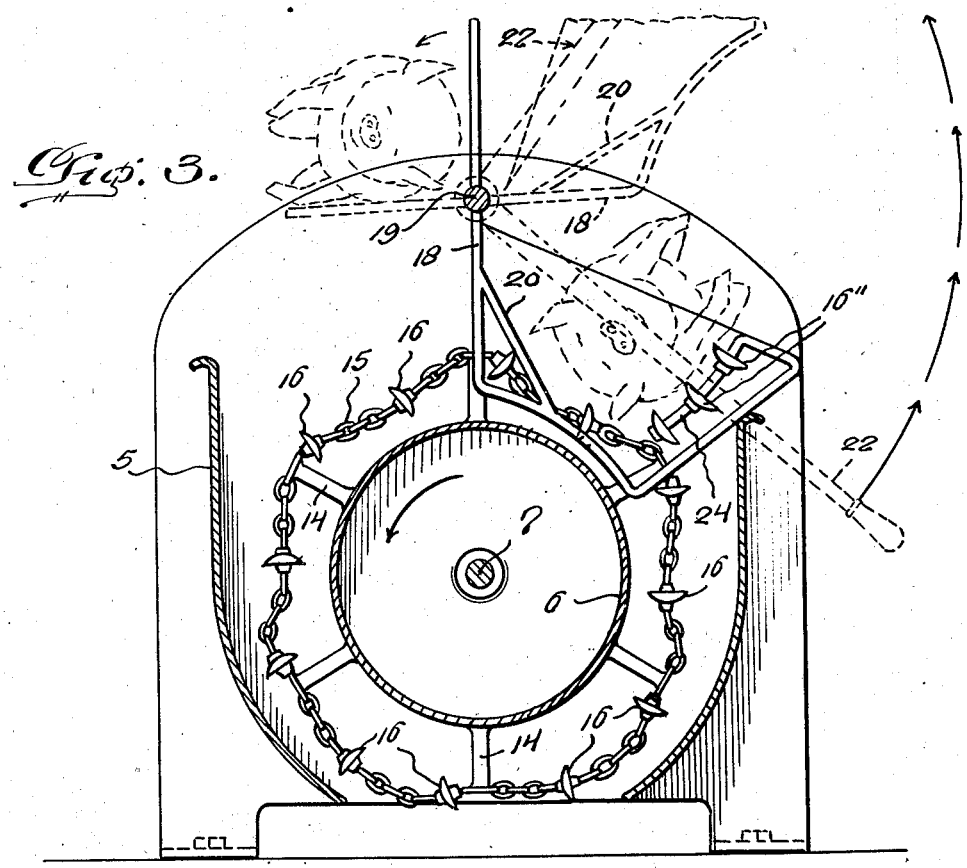
Figure 3 is a transverse section taken on line 3—3 of Figure 2.
Figure 4:
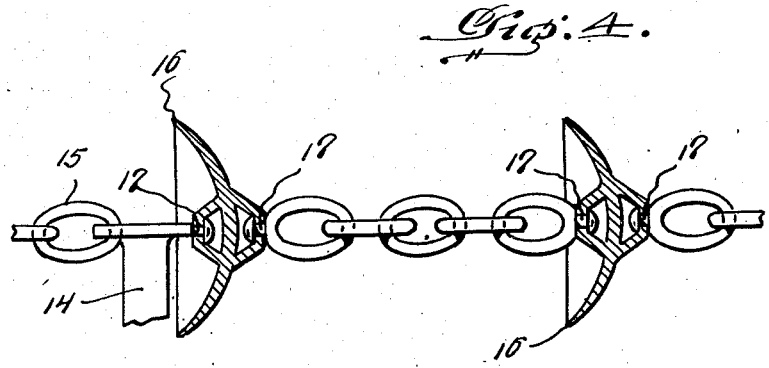
Figure 4 is an enlarged fragmentary detail view of a portion of the scraping disk supporting means and two of the scraping disks, partly in side elevation and partly in section.

The scraping drum includes a plurality of rows of equally spaced radial arms 14 rigid with and projecting from the cylinder 6, and a flexible element 15 extended between and anchored to each pair of adjacent arms 14 of each row, said elements 15 having a plurality of uniformly spaced scraping disks 16 centrally mounted thereon between the arms. Each element 15 may consist of a chain as shown in Figures 1, 3, and 4, or a cable 15a as shown in Figure 5, the disks 16 being swivelled as at 17 in Figure 4 or the disks 16' being swivelled as at 17a in Figure 5, for axial rotation and so as to freely turn and constantly present different portions of their scraping edges to the carcass. The elements 15 or 15a are provided so as to have slight slack therein and thereby insure substantially uniform scraping action of the disks on the curved surface of the carcass.

A cradle for reception of the carcass is mounted above the scraping drum at the front side of the shaft 7, said cradle including a plurality of spaced substantially U-shaped rods 18, having relatively long legs extended through and fixed to a rock shaft 19 journaled in the ends of tub 5 and disposed parallel with and above the drum. The intermediate portions of the rods 18 form the bottom of the cradle and are inclined forwardly so that the carcass will gravitate to the front of the cradle in a direction reverse to the direction of rotation of the drum. This action is increased by brace rods 20 connecting the rear legs of rods 18 with the portions thereof which form the bottom of the cradle. The front legs of rods 18 are provided with rearwardly and downwardly directed yieldable extensions 21 having further scraping disks 16'' journaled thereon. A lever 22 is secured on one end of shaft 19 for rocking the cradle so as to elevate the carcass above the drum and dump it from the machine at the rear of the latter as indicated by dotted lines in Figure 3. When the cradle is in a forwardly and downwardly swung position as shown by full lines in the latter figure, it contacts and rests upon the top of the front wall of tub 5 and supports the carcass so that it will be properly acted upon by the disks 16, the latter moving between the intermediate portions of adjacent rods 18 of the cradle. In use, the machine is arranged with the front thereof adjacent the usual scalding vat, from which the carcass is suitably delivered to the cradle.

Figure 6:
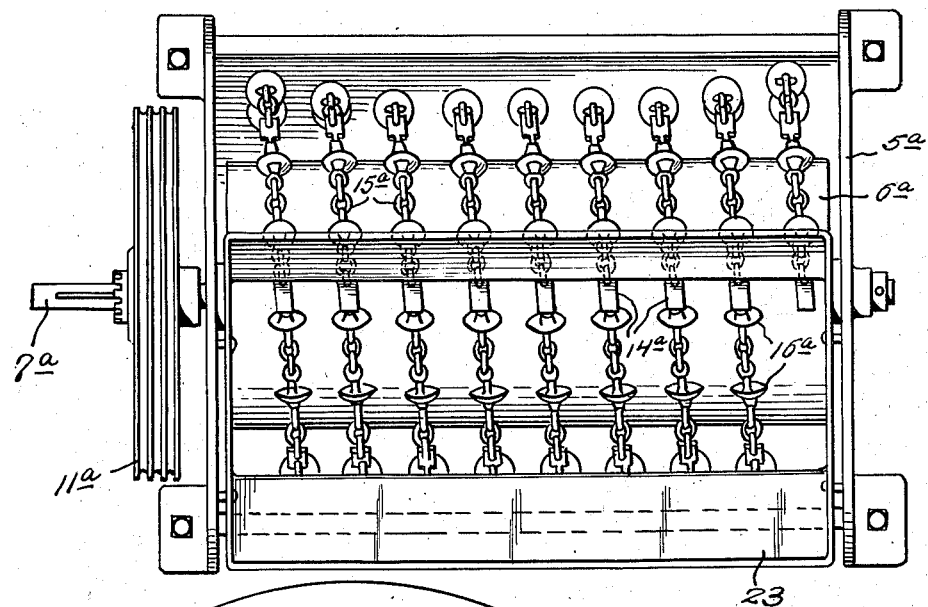
Figure 6 is a view similar to Figure 1, of a modified form of scraping machine embodying the present invention.
Figure 7:
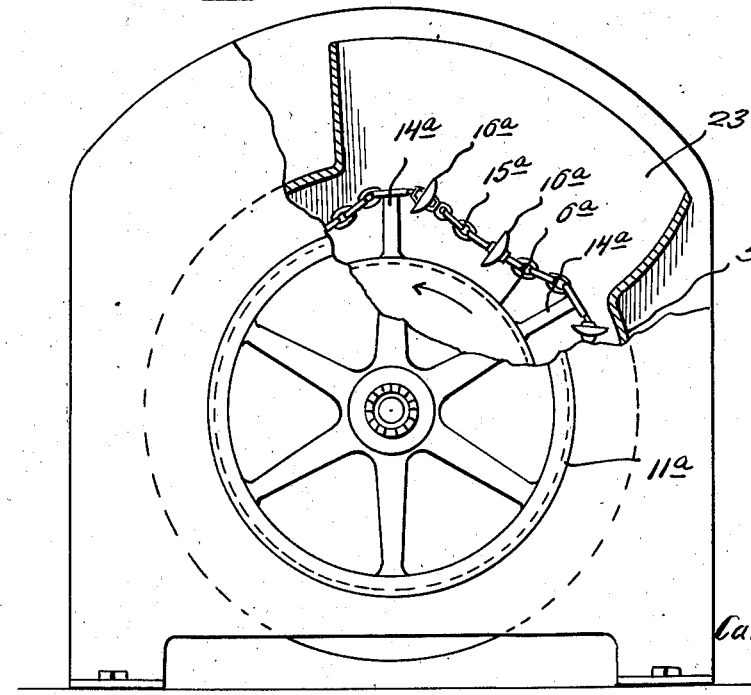
Figure 7 is a view of the machine shown in Figure 6, partly in end elevation and partly in section.

In the embodiment of Figures 6 and 7, the tub 5a has a fixed cradle in the form of a hopper 23 at the top and forward portion thereof to receive and retain the carcass upon the front portion of the drum, there being no tiltable cradle, and the drum being rotated by driving a pulley 11a fixed on the shaft 7a of the drum. In this embodiment, the flexible elements 15a are arranged in a continuous spiral about the surface of cylinder 6a and are attached to spirally arranged arms 14a fixed to and radiating from said cylinder. The disks 16a are swivelled as in Figures 1 to 4 inclusive. The spiral arrangement insures scraping action on all parts of the carcass without effecting movement of the latter longitudinally of the drum.

In the form of Figure 8, the tub 5b has two parallel drums journaled therein in adjacent relation so that the arms 14b, elements 15b, and disks 16b of one drum pass between those of the other drum, said drums including cylinders 6b. The drums are suitably driven in opposite directions, and the tub has a top cradle in the form of a hopper 23a above adjacent portions of the drum to confine the carcass upon said adjacent drum portions while being scraped.

In each instance, the scraping disks are preferably of dished form and the drum or drums are rotated to move the concave sides of the disks toward the carcass. In actual operation the carcass has a rolling action back and forth so as to be effectively scraped at the top and sides thereof. The disks 16″ scrape the cascass effectively as it rolls back to the front of the cradle from the braces 20, after being rolled rearwardly and upwardly onto the latter by the drum.

Minor changes may be made in details of construction, such as fall within the scope of the invention as claimed.

What I claim is:

1. In a carcass scraping machine, a scraping drum including a rotary cylinder provided with radial arms, flexible elements connecting said arms and provided with slack, and scraping disks swivelled at their centers on said flexible elements.

2. In a carcass scraping machine, a scraping drum including a rotary cylinder provided with radial arms, flexible elements connecting said arms and provided with slack, and scraping disks swivelled at their centers on said flexible elements, said disks being dished and disposed so that the concave sides thereof are moved toward the carcass when the cylinder is rotated during the scraping operation.

3. In a carcass scraping machine, a scraping drum including a rotary cylinder provided with radial arms, flexible elements connecting said arms and provided with slack, and scraping disks swivelled at their centers on said flexible elements, and a cradle for retaining the carcass on the upper portion of the drum to one side of its axis of rotation.

4. In a carcass scraping machine, a scraping drum including a rotary cylinder provided with radial arms, flexible elements connecting said arms and provided with slack, and scraping disks swivelled at their centers on said flexible elements, said arms being spirally arranged on the surface of the cylinder and said flexible elements being extended in a continuous spiral from arm to arm about said cylinder.

5. In a carcass scraping machine, a scraping drum including a rotary cylinder provided with radial arms, flexible elements connecting said arms and provided with slack, and scraping disks swivelled at their centers on said flexible elements, and a cradle for retaining the carcass on the upper portion of the drum to one side of its axis of rotation, said cradle including spaced U-shaped members between which the disks pass when the drum is rotated, a rock shaft journaled above the drum, the rear of said cradle being fixed to said shaft, and means to rock the shaft to elevate the cradle and dump the carcass rearwardly therefrom.

6. In a carcass scraping machine, a scraping drum including a rotary cylinder provided with radial arms, flexible elements connecting said arms and provided with slack, and scraping disks swivelled at their centers on said flexible elements, and a cradle for retaining the carcass on the upper portion of the drum to one side of its axis of rotation, said cradle including spaced U-shaped members between which the disks pass when the drum is rotated, a rock shaft journaled above the drum, the rear of said cradle being fixed to said shaft, and means to rock the shaft to elevate the cradle and dump the carcass rearwardly therefrom, said cradle being arranged to rest against the front of the tub with its bottom inclined forwardly during the scraping operation.

7. In a carcass scraping machine, a pair of adjacent parallel scraping drums, rotated in opposite directions, each drum including a rotary cylinder provided with radial arms, flexible elements connecting said arms and provided with slack, and scraping disks swivelled at their centers on said flexible elements, and means to retain the carcass on the adjacent portions of the drums, the arms, flexible elements, and disks of one drum being movable between adjacent ones of those of the other drum.

8. In a carcass scraping machine, a scraping drum including a rotary cylinder provided with radial arms, flexible elements extending circumferentially of and about said cylinder substantially from end to end of the latter, said flexible elements connecting the outer end of said arms and being provided with slack between adjacent arms, and scraping members mounted on said flexible elements between adjacent arms.

9. In a carcass scraping machine, a scraping drum including a rotary cylinder provided with radial arms, flexible elements connecting said arms and provided with slack, and scraping disks swivelled at their centers on said flexible elements, and a cradle for retaining the carcass on the upper portion of the drum to one side of its axis of rotation, said cradle including spaced U-shaped members between which the disks pass when the drum is rotated, a rock shaft journaled above the drum, the rear of said cradle being fixed to said shaft, and means to rock the shaft to elevate the cradle and dump the carcass rearwardly therefrom, said spaced cradle members having rearwardly and inwardly directed yieldable front extensions, and further scraping disks journaled on said extensions.

10. In a carcass scraping machine, a scraping drum including a rotary cylinder provided with radial arms, flexible elements connecting said arms and provided with slack, and scraping disks swivelled at their centers on said flexible elements, and a cradle for retaining the carcass on the upper portion of the drum to one side of its axis of rotation, said cradle including spaced U-shaped members between which the disks pass when the drum is rotated, a rock shaft journaled above the drum, the rear of said cradle being fixed to said shaft, and means to rock the shaft to elevate the cradle and dump the carcass rearwardly therefrom, said spaced cradle members having rearwardly and inwardly directed yieldable front extensions, and further scraping disks journaled on said extensions, and braces connecting the rear and intermediate portions of said U-shaped members.

CARL H. O. TIMMERMAN.

REFERENCES CITED

The following references are of record in the file of this patent:

UNITED STATES PATENTS

| Number | Name | Date |
|---|---|---|
| 493,454 | Tobin | Mar. 14, 1893 |

FOREIGN PATENTS

| Number | Country | Date |
|---|---|---|
| 402,408 | Great Britain | Nov. 24, 1933 |